Nov. 1, 1927.
G. E. CHATILLON
1,647,272
DYNAMOMETER
Filed Oct. 28, 1925
2 Sheets-Sheet 1
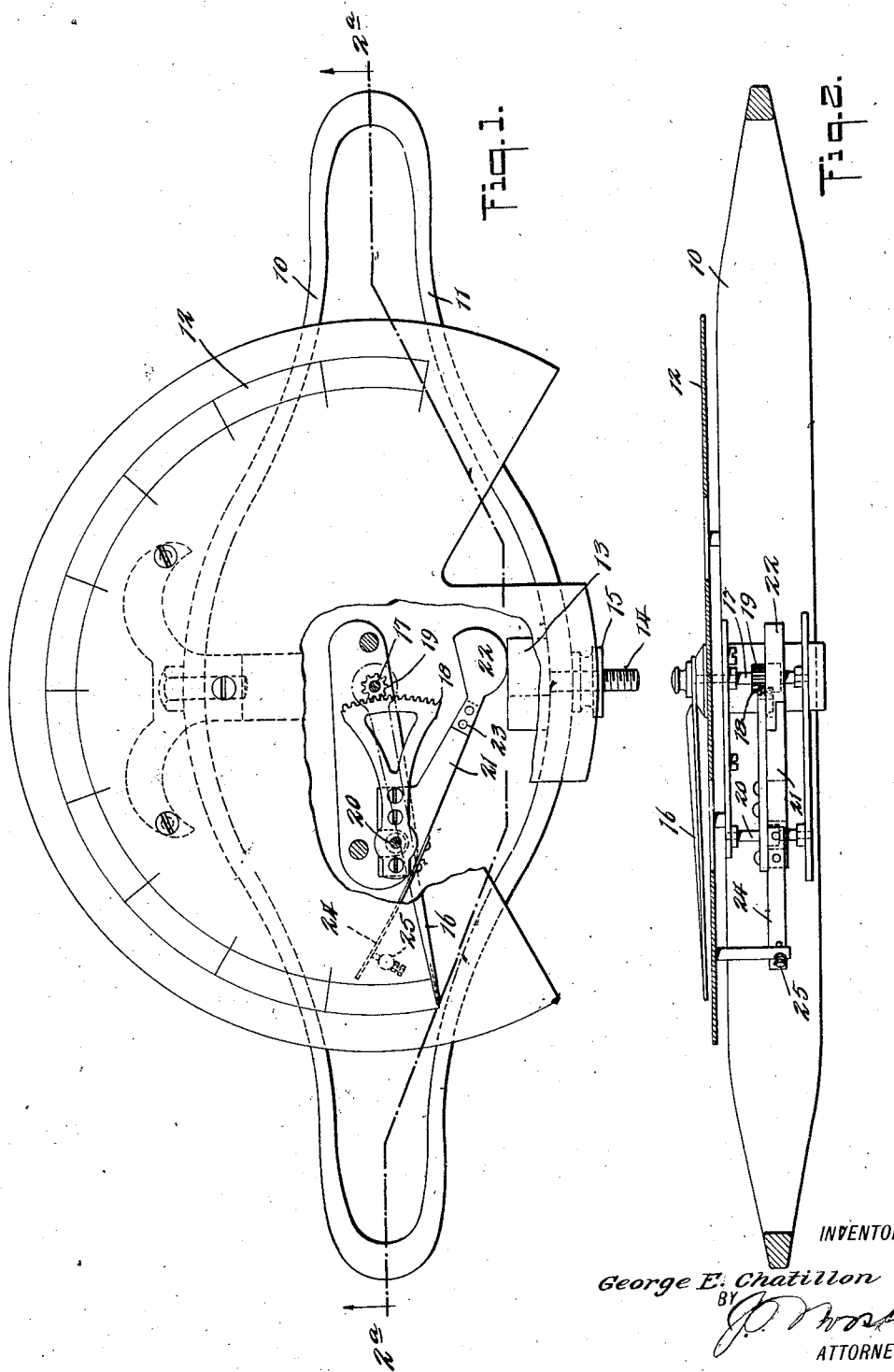
INVENTOR
George E. Chatillon
BY
ATTORNEY

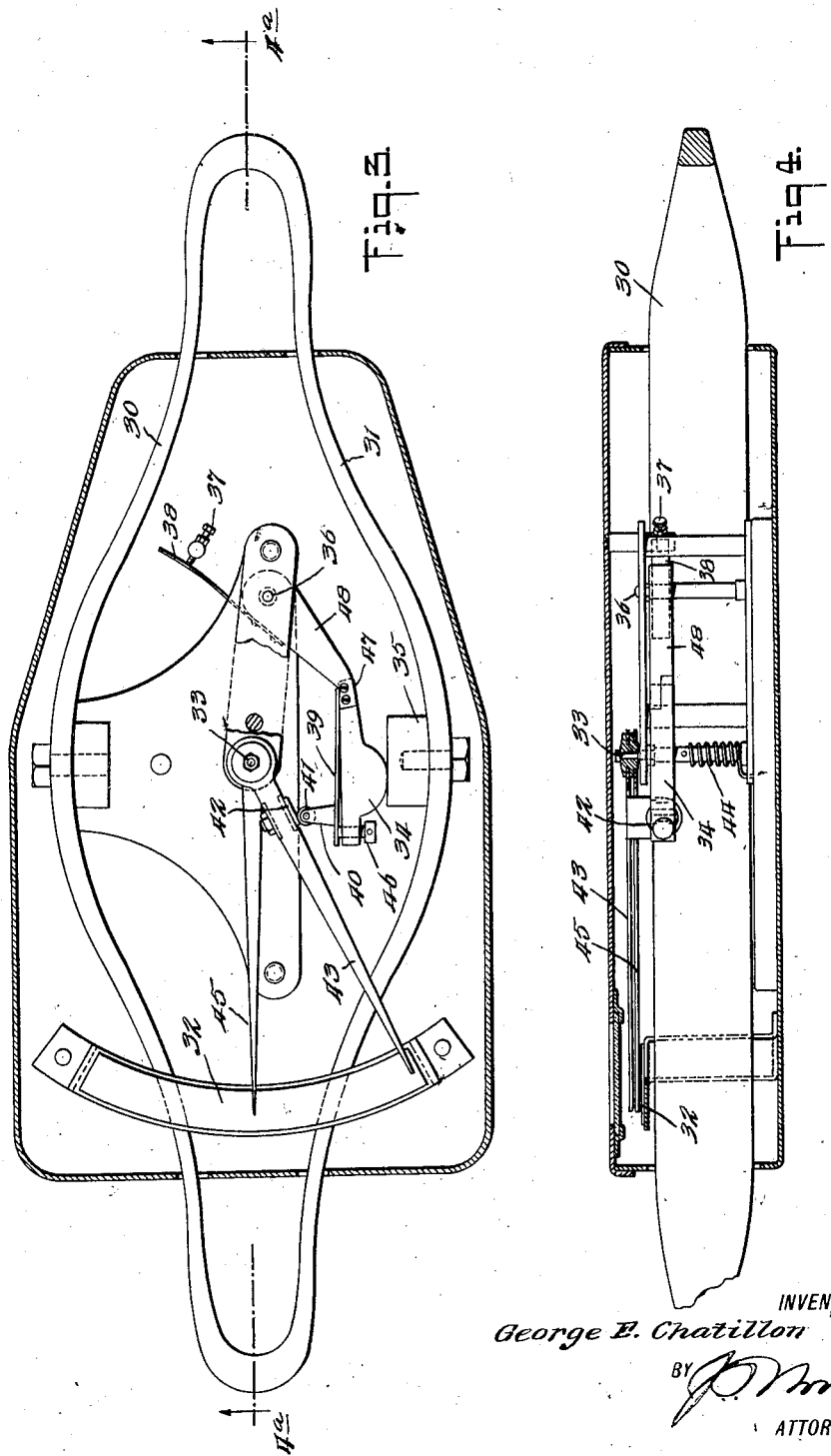

Patented Nov. 1, 1927.

1,647,272

UNITED STATES PATENT OFFICE.

GEORGE E. CHATILLON, OF NEW YORK, N. Y., ASSIGNOR TO JOHN CHATILLON & SONS, OF NEW YORK, N. Y., A CORPORATION OF NEW YORK.

DYNAMOMETER.

Application filed October 28, 1925. Serial No. 65,307.

This invention relates to dynamometers of the so-called crescent or elliptical spring type, and has for its object to cheapen cost of manufacture and provide an instrument which is more easily calibrated especially in the field, without the aid of the usual factory equipment.

Heretofore in the manufacture of dynamometers of this type, it has been customary to provide a specially calibrated scale for each instrument. This is because it has been impossible to shape the springs of each instrument exactly the same without prohibitive cost and refinements. Another reason why it is necessary to calibrate each scale is that the load characteristics of the springs cannot be made uniform. These problems arise only in dynamometers where the loads are tremendous by comparison with ordinary spring scales, for example where the springs and load characteristics can be made substantially identical, or at least within negligible results. In the dynamometer art, on the other hand, no way has yet been devised to make the springs and their load characteristics substantially the same under the very heavy forces applied, so that a predetermined scale may be used for all instruments of the same type, nor to do away with the necessity of calibrating each scale, for each instrument.

According to this invention, means are provided to compensate for these variations in load characteristics of the elliptical spring type dynamometers by providing a mechanism for adjusting or changing localized portions of the indicator actuating mechanism in order that the same scale may be used with all instruments of the same type. Specifically this includes a demountable cam located to be accessible for having its shape changed where needed by filing or the like, to enable calibration of the instrument to be made to accord with a previously made scale.

Referring to the drawings:

Figure 1 shows a dynamometer embodying this invention,

Fig. 2 is a section on the line 2ª—2ª of Fig. 1,

Fig. 3 shows the preferred embodiment of this invention,

Fig. 4 is a section on the line 4ª—4ª of Fig. 3.

In Figures 1 and 2 the closed elliptical spring has an indicator 12 secured on its upper side. Between its lower side 11 and the indicator is placed the transmission mechanism for actuating the indicator. This comprises the block 13 mounted on the threaded stem 14 provided with an adjusting nut 15 for controlling the height of the block 13. The indicator includes a pointer 16 mounted on a shaft 17, and actuated by a pinion 19 engaging a curve rack 18 rigidly on the shaft 20. Also rigidly on the shaft 20 is the lever 21 provided with a cam 22 engaging the block 13. The cam has a detachable connection 23 with the lever 21, enabling the cam to be easily replaced if necessary. On the application of load to the ends of the dynamometer, the two sides move together and the block 13 raises the cam, causing the pointer 16 to move over the scale 12. To insure return of the transmission mechanism and the pointer to zero position on removal of the load, a flat spring 24 is secured on the lever 21 for engagement with a detachable stop 25.

In Figures 3 and 4 is shown another type of dynamometer having no rack and pinion in the transmission mechanism, thus doing away with wear and consequent back lash in a rack and pinion and making a more rigid and lasting construction. The spring is of the same type, having the scale 32 secured to the upper side 30 and the transmission mechanism located between the lower side 31 and the indicator. Mounted on the shaft 33 for movement over the scale 32 is the pointer 43. The transmission mechanism includes the cam 34 engaging the block 35 secured on the lower side of the spring. The lever 48 carrying the cam 34 is pivoted at 36. A flat spring 38 secured to the cam lever engages a stop pin 37 for returning the cam and its lever to a no load position on sudden release of the load. A connecting member 40 directly contacts with the pointer 43 and the cam 34 for transmitting movement of the cam to the pointer. This connecting member is secured to the cam by a spring 39 adjustable by screw 46 for controlling the effective length of the connection member 40, whereby zero adjustment of the indicator is made possible. A roller bearing 41 on the connecting member 40 engages a co-operating surface 42 on the pointer 43. The connecting member 40 is not secured to the pointer so that the pointer and cam are capable of separately returning to zero position on removal of load, the pointer being returned by a helical spring 44 wound around the shaft 33 and cooperating with the shaft and with the frame on upper side of the spring. The usual maximum indicator or pointer 45 may be placed on either of the two instruments shown. A detachable connection 47 enables the cam 34 to be easily replaced when needed.

Among the advantages of this invention may be mentioned the reduced cost of manufacture, since instead of the necessity of calibrating a separate scale for each instrument, a standard scale can be used for all instruments of the same type. Calibration of the spring and its transmission mechanism to accord with the predetermined scale is performed with facility and may be readily done in the field without factory refinements by raising the cam from its cooperating block and filing a little of the cam surface sufficient to change its contour and bring the pointer to the correct scale graduation. In the field, by connecting the dynamometer to be calibrated in series with a standard instrument so that the load on both is the same, these adjustments may be readily made. If too much of the cam is filed, which is not likely to happen, a new cam may be inserted by means of the detachable connection 47 securing the cam to its lever in each modification illustrated. Facility of adjustment of the cam contour thus compensates for irregularities in the load characteristics of springs of the same type, which variations have previously been insurmountable in this art. The preferred form of instrument has a toothless transmission mechanism which is more rigid and strong in withstanding the sudden shocks through quick removal of a load, as when something to which the load has been applied breaks. In case the spring changes with use, it is not necessary to send the dynamometer back to the factory to have a new scale calibrated but only necessary to refile the cam in portions or replace the cam and readjust its contour. This type of dynamometer is especially useful as a portable instrument where compactness as well as cheapness of cost are desirable.

I claim:

1. A dynamometer comprising in combination a spring, an indicator secured to one side of said spring, a transmission mechanism between the other side of the spring and the indicator for actuating the same, and including means enabling the spring and its transmission mechanism to be calibrated to a given scale throughout.

2. A dynamometer comprising in combination a closed spring of the elliptical type, an indicator secured to one side of said spring, a transmission mechanism between the indicator and the other side of the spring for actuating the indicator, and means including a cam accessibly located for adjustment of its contour during the application of load to the dynamometer for enabling the spring and its transmission mechanism to be calibrated to a given scale.

3. A dynamometer comprising in combination a closed spring of the elliptical type, a dial and pointer secured to one side of said spring, transmission mechanism between the other side of the spring and the indicator for actuating the same, and including a cam accessibly located to have its contour changed, and a toothless connecting member directly contacting with said pointer and cam.

4. A dynamometer comprising in combination a spring, an indicator secured to one side of said spring, a transmission mechanism between the other side of the spring and the indicator for actuating the same, and including means capable of adjustment in localized portions to calibrate a spring to a given scale.

5. A dynamometer comprising in combination a closed spring of the elliptical type, a dial and pointer secured to one side of said spring transmission mechanism between the other side of the spring and the indicator for actuating the same, and including a cam accessibly located to have its contour changed, and a toothless connecting member directly contacting with said pointer and cam, said member being secured to one of them for movement therewith, and separate means for returning the cam and pointer to a no load position independently of one another.

6. A dynamometer comprising in combination a closed spring of the elliptical type, an indicator secured to one side of said spring, a transmission mechanism between the indicator and the other side of the spring for actuating the indicator, and means including a demountable cam accessibly located for adjustment of its contour during the application of load to the dynamometer for enabling the spring and its transmission mechanism to be calibrated to a given scale.

7. A dynamometer comprising in combination a closed spring of the elliptical type, a dial and pointer secured to one side of said spring, transmission mechanism between the other side of the spring and the indicator for actuating the same, and including a cam accessibly located to have its contour changed, a toothless connecting member directly contacting with said pointer and cam, and means for varying the effective length of said connecting member to control a zero adjustment of said pointer.

8. A dynamometer comprising in combination a spring, an indicator secured to one side of the spring transmission mechanism between the other side of the spring and said indicator, means within said mechanism for adjusting the same to calibrate said spring and indicator, throughout the indicator range, a separable connection between said indicator and transmission mechanism, and means capable of separately returning said indicator and transmission mechanism to zero position on removal of the load.

Signed at New York city, in the county of New York and State of New York.

GEORGE E. CHATILLON.